United States Patent [19]

Scott

[11] Patent Number: 5,083,076

[45] Date of Patent: Jan. 21, 1992

[54] PORTABLE BATTERY BOOSTER

[75] Inventor: Clyde A. Scott, Kirkland, Wash.

[73] Assignee: P.S.O. Electric, Incorporated, Seattle, Wash.

[21] Appl. No.: 436,516

[22] Filed: Nov. 13, 1989

[51] Int. Cl.⁵ .................. H02J 7/00; H01M 10/46; H01R 11/00

[52] U.S. Cl. .................................. 320/2; 320/7; 320/16; 320/25; 320/48

[58] Field of Search ............... 320/2, 7, 25, 26, 15, 320/16, 48

[56] References Cited

U.S. PATENT DOCUMENTS

| | | | |
|---|---|---|---|
| 3,590,357 | 6/1971 | Reid | 320/7 |
| 4,233,552 | 11/1980 | Baumbach | 320/16 X |
| 4,272,142 | 6/1981 | Zapf | 320/25 X |
| 4,366,430 | 12/1982 | Wright | 320/25 |
| 4,617,506 | 10/1986 | Bogie et al. | 320/2 |
| 4,649,332 | 3/1987 | Bell | 320/16 X |
| 4,902,955 | 2/1990 | Manis et al. | 320/2 |

Primary Examiner—Robert J. Hickey
Attorney, Agent, or Firm—Ward Brown; Robert W. Beach

[57] ABSTRACT

A wheeled cabinet contains two internal booster batteries. Jumper cables are connectible to the booster batteries by a plug-and-socket connector. With the plug disconnected from the socket, end clamps of the jumper cables are applied across a battery or batteries of a vehicle to be jump started. Display lamps are actuated to indicate whether or not the polarity of the jumper cables as connected to the vehicle battery or batteries is correct and whether or not the connection points are appropriate for the potential (12 volt or 24 volt) which should be applied. When it is determined that the connection of the jumper cables to the vehicle batteries is correct, the plug is inserted into the socket to connect the booster batteries to the vehicle battery or batteries and permit jump-starting of the vehicle.

8 Claims, 7 Drawing Sheets

PORTABLE BATTERY BOOSTER

BACKGROUND OF THE INVENTION

1. Field of the Invention

The present invention relates to a portable battery-containing unit usable to jump start a variety of different types of vehicles including large trucks and heavy equipment. Such unit is designed for use with electrical systems and starters of different voltages (12 volts or 24 volts) by connection of jumper cables having standard end clamps to the vehicle batteries, but with polarity and voltage indicators to assure that the vehicle batteries are not connected to the booster batteries if the end clamps are improperly connected.

2. Prior Art

Large trucks and heavy equipment often are provided with banks of batteries for powering the starter and electrical accessories. In some instances, both the electrical system (accessories) and starter are designed for 12-volt operation, in which case a bank of 12-volt batteries connected in parallel can be provided. Sometimes both the electrical system and starter are designed to operate at 24 volts, in which case banks of 12-volt batteries are connected in series. In some instances, the electrical system is designed to operate at 12 volts, whereas the starter is designed to operate at 24 volts, in which case banks of 12-volt batteries are connected in series only for operating the starter.

When it is necessary to jump start the vehicle, it can be difficult to connect booster batteries to the vehicle batteries properly. The polarity of the vehicle battery terminals may not be clearly visible, it may be dark and/or access to the battery compartment may be limited, and the routing of cables between the vehicle batteries can make it difficult to determine proper connection points for the end clamps of the jumper cables. Improper connection of the jumper cables can result in dangerous violent sparking, large current flow, overheating of the cables and batteries and possible damage to the batteries and electrical components of the vehicle.

SUMMARY OF THE INVENTION

It is an object of the present invention to provide a single portable unit usable to jump start vehicles having 12-volt or 24-volt starters and 12-volt or 24-volt electrical systems.

It also is an object to provide such a unit in compact, sturdy and portable form.

Another object is to provide such a unit having booster batteries, built-in jumper cables and safeguards to prevent interconnection of the booster batteries with the vehicle batteries if the jumper cables are improperly connected to the vehicle batteries.

A further object is to provide such a unit with mechanism usable to determine the proper connection points for jumper cables.

Another object is to provide such a unit in a form easy to use, even by inexperienced unskilled workmen, and in a form requiring minimal maintenance.

In the preferred embodiment of the present invention the foregoing objects are accomplished by providing a portable battery booster including a wheeled cabinet containing a plurality of batteries. An end plug is connectible to one or more electrical sockets for conveying current from the booster batteries through jumper cables. Prior to connection of the jumper cables to the booster batteries by interconnection of the end plug and socket, however, the jumper cables first are connected to the vehicle batteries. Internal circuitry and a bank of indicator lights are provided to detect and display the polarity and voltage between the jumper cable end clamps. If the polarity or voltage is incorrect, the connection points of the jumper cables can be adjusted prior to interconnecting the booster batteries with the jumper cables and vehicle batteries.

Preferably, the portable battery booster unit also has internal circuitry and display mechanism to indicate if there is a short between the jumper cable end clamps.

The portable battery booster unit also can include a separate charger for each of the booster batteries. When not in use, the booster batteries can be recharged without requiring additional equipment.

The portable battery booster unit can be provided with a single pair of jumper cables with a single plug connectible to alternative sockets. When plugged into one socket, the jumper cables convey 12-volt power by being connected to two internal booster batteries in parallel, whereas when plugged into the other socket, the cables convey 24-volt power by being connected to the two internal booster batteries in series.

In another form of the invention, a separate pair of cables is provided for each of the booster batteries, but each pair is connected to its battery by use of one plug and socket connector.

DETAILED DESCRIPTION

Figure 1:
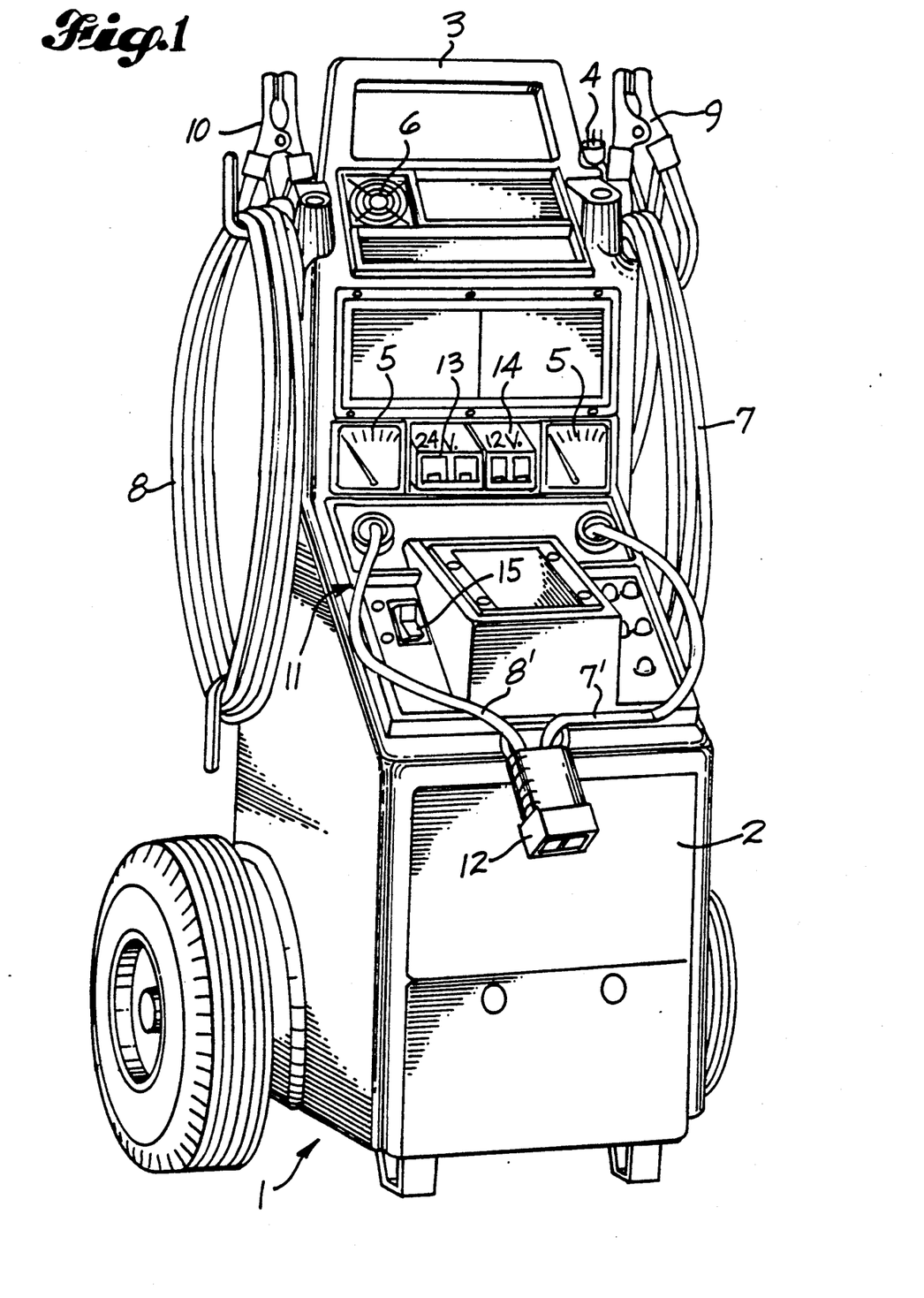
FIG. 1 is a top front perspective of a portable battery booster in accordance with the present invention.

With reference to FIG. 1, a portable battery booster 1 in accordance with the present invention preferably uses a wheeled cabinet 2 having a top handle 3 allowing the unit to be moved conveniently from one location to another. For example, the booster can be moved easily from a storage or charging location to a vehicle to be jump started. The cabinet 2 contains at least two internal booster batteries and a separate conventional charger for each battery. Both chargers can be actuated by connecting a single electrical plug 4 to a source of line current, and a separate ammeter 5 is provided for each charger to indicate the progress of charging of the corresponding booster battery. Electrical power conveyed through the plug 4 preferably operates an internal fan to draw air through an inlet 6 to cool the interior of the cabinet 2 during charging of the batteries. Exhaust outlets can be provided in the bottom, back and/or sides of the cabinet.

The embodiment shown in FIG. 1 utilizes a single pair of jumper cables, namely, a negative cable 7 mounted at the left of the cabinet and a positive cable 8 mounted at the right of the cabinet. Jumper cable 7 has a conventional end clamp 9 and jumper cable 8 has a conventional end clamp 10. The ends of cables 7 and 8 opposite their end clamps 9 and 10 extend into the cabinet 2 and are connected to electrical circuitry described in detail below. In addition, a negative cable segment 7' and a positive cable segment 8' extend from the central or control panel section 11 of the booster unit to a heavy-duty electrical plug 12. Plug 12 is normally in the disconnected position shown, but can be manually plugged into a left socket 14 or a right socket 13.

In general, when it is desired to jump start a vehicle, the booster 1 can be rolled to the vehicle and the end clamps 9 and 10 connected to the terminals of the vehicle batteries with proper polarity. For a 12-volt system, it is only necessary to connect the negative end clamp 9 to a negative battery terminal and the positive end clamp 10 to the positive terminal of the same battery. Plug 12 then is inserted into the left socket 14 which has the effect of connecting the jumper cables and two internal booster batteries in parallel. The vehicle then can be started.

In the case of a 24-volt system, end clamp 9 is connected to a grounded negative vehicle battery terminal and end clamp 10 is connected to the positive terminal of a second battery connected in series with the first battery. Plug 12 is inserted into the right socket 13 which has the effect of connecting two internal booster batteries in series between the jumper cables for conveying 24 volts across the appropriate terminals of the vehicle batteries.

It is not always easy to determine proper connection points for the end clamps 9 and 10. Vehicles of the type with which the present invention is intended to be used, namely, large trucks and heavy equipment, commonly have several batteries provided in banks. Opening the battery compartment reveals numerous cables interconnecting such batteries and it can be difficult to trace the connections, particularly if it is dark or access to them is limited. Consequently, the portable battery booster in accordance with the present invention includes internal circuitry and indicators by which it can be quickly and easily determined whether or not the end clamps 9 and 10 have been properly connected. If necessary, the connections can be changed prior to interconnecting the booster batteries with the vehicle batteries by use of the plug 12 and the appropriate socket 13 or 14.

Figure 2:
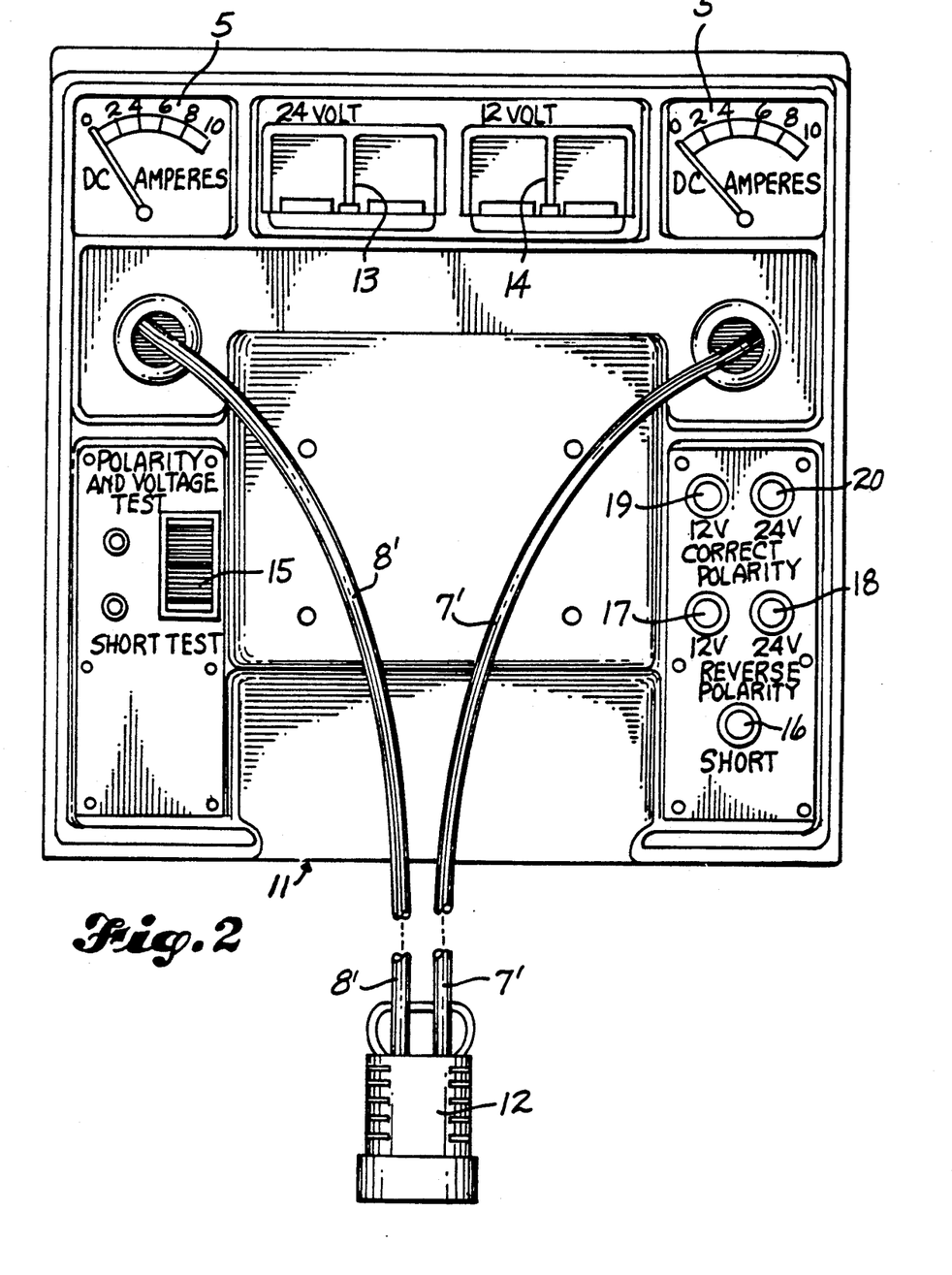
FIG. 2 is a fragmentary front elevation of the control panel of the portable battery booster of FIG. 1.

More specifically, the control panel portion 11 of the booster is shown in more detail in FIG. 2. With the plug 12 disconnected from the sockets, a rocker switch 15 is used to select one of two testing conditions. In one position, the downward swung position as viewed in FIG. 2, an indicator lamp 16, preferably amber, will be actuated if there is a short between the end clamps of the jumper cables. For example, such clamps could be touching or be connected to interconnected negative terminals or interconnected positive terminals, or there could be a dead short in the electrical system of the vehicle.

If no short is detected, the rocker switch can be moved to its second position, the upward swung position as viewed in FIG. 2. In such position, one or both of two indicator lamps 17 and 18, preferably red, will be actuated if the polarity of the jumper cables is incorrect, i.e., if the negative cable has been connected to a positive vehicle battery terminal and the positive cable has been connected to a negative vehicle battery terminal. If the reverse polarity voltage is below about 12 volts, only lamp 17 is actuated, whereas approximately 15 to 24 volts applied across the improperly connected cables results in actuation of both lamp 17 and lamp 18. In either case, the operator is alerted to correct the polarity before proceeding.

If the polarity of the cables as connected to the vehicle batteries is correct, one or both of two indicator lamps 19 and 20, preferably green, will be actuated A potential of below approximately 12 volts applied across the cables results in actuation of lamp 19, whereas application of about 15 to 24 volts across the cables results in actuation of both lamp 19 and lamp 20.

For a 12-volt system, the connection points of the jumper cables to the vehicle batteries can be adjusted until indicator lamp 19 is actuated, whereupon plug 12 can be inserted into socket 14 for conveying 12-volt power from the booster batteries to the vehicle batteries. Similarly, for a 24-volt system, the connection points of the jumper cables can be adjusted until both lamps 19 and 20 are actuated, at which time it is safe to insert plug 12 into socket 13 for conveying 24-volt power from the booster batteries to the vehicle batteries.

Figure 3:
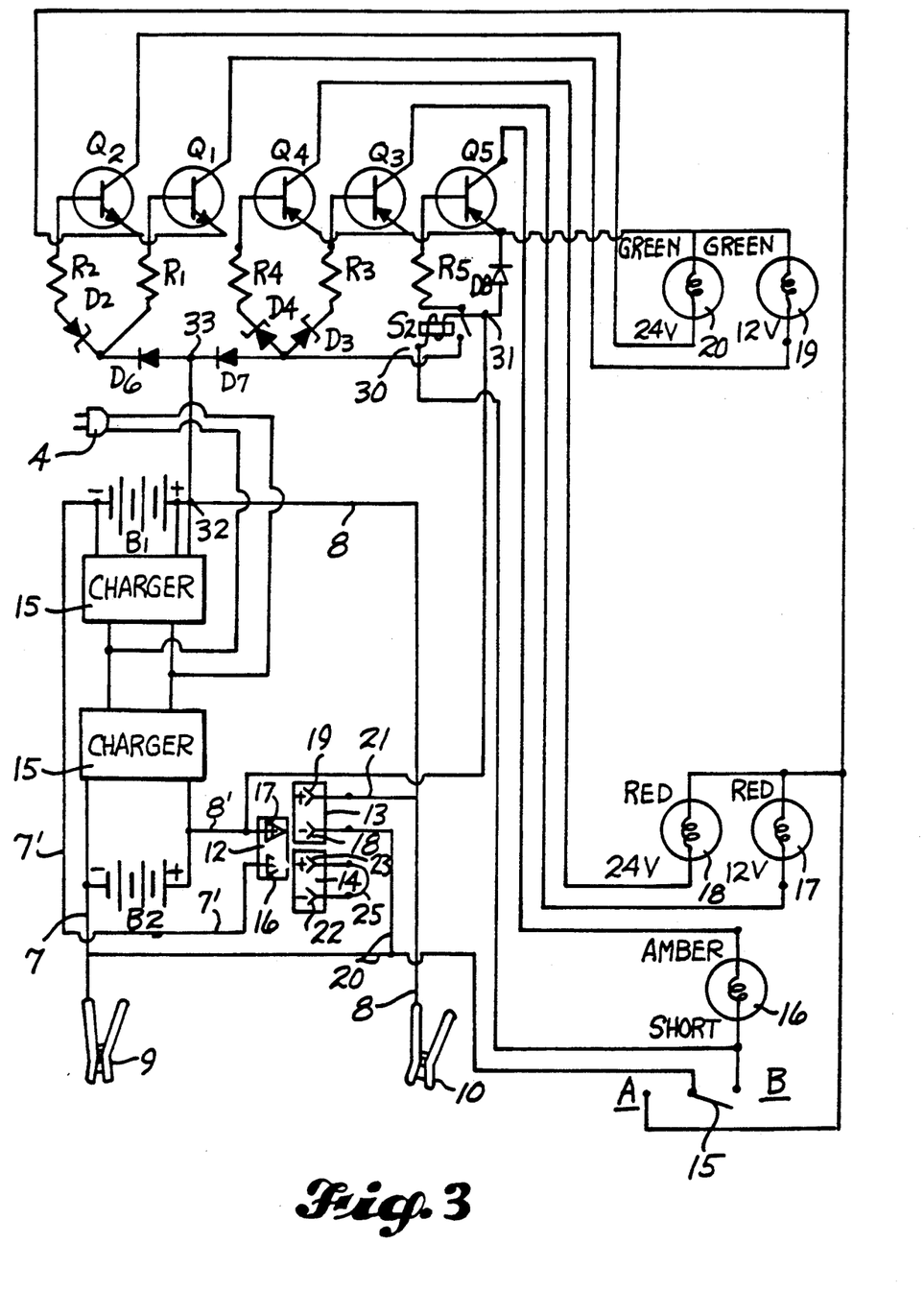
FIG. 3 is a schematic circuit diagram of the portable battery booster of FIG. 1.

The essential components of the electrical circuit for the first embodiment of the present invention are shown schematically in FIG. 3. As previously described, a separate charger 15 is provided for each of the internal booster batteries B1 and B2, such chargers being interconnected so as to be powered by connection of the single electrical plug 4 to a source of line current.

The negative jumper cable 7 and its end clamp 9 are connected to the negative terminal of one of the internal booster batteries B2. The positive jumper cable 8 and its end clamp 10 are connected to the positive terminal of the other internal booster battery B1. The negative cable segment 7' projecting from the cabinet to the plug 12 is connected to the negative terminal of battery B1, whereas the positive cable segment 8' projecting from the cabinet to the plug 12 is connected to the positive terminal of battery B2.

Plug 12 has a negative conductor portion 16, i.e., the conductor portion connected to cable segment 7', and a positive conductor portion 17, i.e., the conductor portion connected to the positive cable segment 8'. Socket 13 has a negative conductor portion 18 and a positive conductor portion 19 engageable by the negative and positive conductor portions of the plug 12, respectively, when the plug is inserted into such socket. Conductor 18 is connected to cable 7 by a lead 20, and conductor 19 is connected to cable 8 by a lead 21. Consequently, when plug 12 is inserted into the socket 13, the negative terminal of battery B1 is connected to the negative terminal of battery B2 by the cable segment 7', interfitted conductors 16 and 18, lead 20 and cable 7. Similarly, the positive terminal of battery B2 is connected to the positive terminal of battery B1 by cable segment 8', interfitted conductors 17 and 19, lead 21 and cable 8. In such condition, booster batteries B1 and B2 are connected in parallel between the end clamps 9 and 10 for supplying 12-volt power between such clamps.

Socket 14 has negative and positive conductors 22 and 23 engageable by the negative and positive conductors 16 and 17 of the plug 12 when such plug is inserted into socket 14. Proceeding from the negative clamp 9, such clamp is connected to the negative terminal of battery B2 by cable 7. From the positive terminal of such battery, cable segment 8' extends to the positive conductor 17 of plug 12 engaged against the positive conductor 23 of socket 14. Such positive conductor 23 is connected to the negative conductor 22 of the socket by a lead 25. The negative conductor 22 of socket 14 will be engaged by the negative conductor 16 of the plug which, through cable segment 7', extends to the negative terminal of battery B1. From the positive terminal of battery B1, cable 8 extends to the positive end clamp 10. Consequently, when plug 12 is inserted into the socket 14, the batteries B1 and B2 are connected in series between the end clamps 9 and 10 to provide 24-volt power.

The remainder of the circuit is devoted to actuating the indicator lamps 16, 17, 18, 19 and 20, depending on the connection of the jumper cable end clamps 9 and 10 to the vehicle batteries. Actuation of such indicator lights is controlled by five transistors Q1 through Q5, each having its own base resistor R1 through R5, respectively. Current flow is controlled by diodes D6, D7 and D8. For transistors Q2, Q3 and Q4, current flow and voltage is controlled by Zener diodes D2, D3 and D4 connected in series with the corresponding base resistors R2, R3 and R4. Actuation of the amber lamp 16 indicating a short also is controlled by the position of switch 15 which in turn controls actuation of a relay S2. Representative components of the circuit are:

Q1 and Q2: NPN transistors (TIP 31)
Q3, Q4, Q5: PNP transistors (TIP 32)
R1, R2, R3, R4, R5: 680-ohm resistors
D2, D3: 15-volt Zener diodes
D4: 27-volt Zener diode
D6, D7, D8: ½-watt trimmer diodes
15: Single-pole, double-throw switch
S2: Relay (normally open)
16, 17, 18, 19, 20: 12-volt lamps Testing for a short between the end clamps 9 and 10 is begun by moving switch 15 to its "B" position. Points 30 and 31 of the relay S2 are connected between the negative and positive terminals of battery B2, thereby closing the switch of the relay. If there is a short between terminal end clamps 9 and 10, the negative terminal of battery B2 is connected to the positive terminal of battery B1, representing the grounded (zero voltage) state at points 32 and 33, for exan. le. Current flows through resistor R5, the relay switch and diode D7, actuating transistor Q5 such that there is current flow from the positive terminal of battery B2 through diode D8, transistor Q5, the amber lamp 16, and switch 15 to the negative terminal of battery B2. If there is no short between the jumper cable end clamps 9 and 10, the amber lamp will not be lit.

Polarity and voltage testing is accomplished with switch 15 in its "A" position. The switch of relay S2 returns to its normally open position and transistor Q5 and the amber light 16 are disconnected from the power loop. In the case of reverse polarity, clamp 10 is connected to a negative vehicle battery terminal, resulting in grounding points 32 and 33 of the circuit. Clamp 9 is connected to a positive vehicle battery terminal which has the effect of connecting battery B2 in series with the voltage between clamps 10 and 9. In the case of 24-volt reverse polarity power between end clamp 10 (now negative) and end clamp 9 (now positive), the resulting voltage at the positive terminal of battery B2 would be about 36 volts as compared to about 24 volts applied at end clamp 9. The 24-volt potential at end clamp 9 also is applied through switch 15 at point A and the red lamps 17 and 18 to the transistors Q3 and Q4. Passage of current through transistors Q1 and Q2 to point 33 is prevented by diode D6. There is a 12-volt drop across each of transistors Q3 and Q4, and the threshold voltage of both Zener diodes D3 (15-volt diode) and D4 (27-volt diode) are exceeded. Consequently, both red lamps 17 and 18 are actuated.

If, however, the reverse polarity voltage is 12 volts, then such 12-volt reverse polarity voltage is connected in series with battery B2 resulting in a voltage of about 24 volts at the positive terminal of battery B2 rather than 36 volts. Current flow and operation is identical except that diode D4 (27-volt Zener) prevents actuation of transistor Q4. Only transistor Q3 is actuated, resulting in lighting only lamp 17 to indicate 12-volt reverse polarity voltage.

In the case of correct polarity voltage across end clamps 9 and 10 (negative to clamp 9 and positive to clamp 10), the ground at clamp 9 can be followed around the circuit diagram counterclockwise through switch 15 in its A position to transistors Q1 and Q2. Positive voltage is applied at clamp 10 and, hence, at points 32 and 33. Current can flow through diode D6 but not diode D7. If the voltage applied across clamps 9 and 10 and, consequently, at points 32 and 33 is 24 volts, the threshold of diode D2 (15-volt Zener) is exceeded so that both transistor Q1 and Q2 and the corresponding green lamps 19 and 20 are actuated. If 12-volt correct polarity power is applied at the end clamps, the threshold of diode D2 is not exceeded. Only transistor Q1 is actuated so as to light only lamp 19. Once correct polarity has been established, the connections of the end clamps to the vehicle battery terminals need be adjusted only if the voltage is improper, such as if only lamp 19 is lit when it is desired to jump a 24-volt system.

Figure 4:
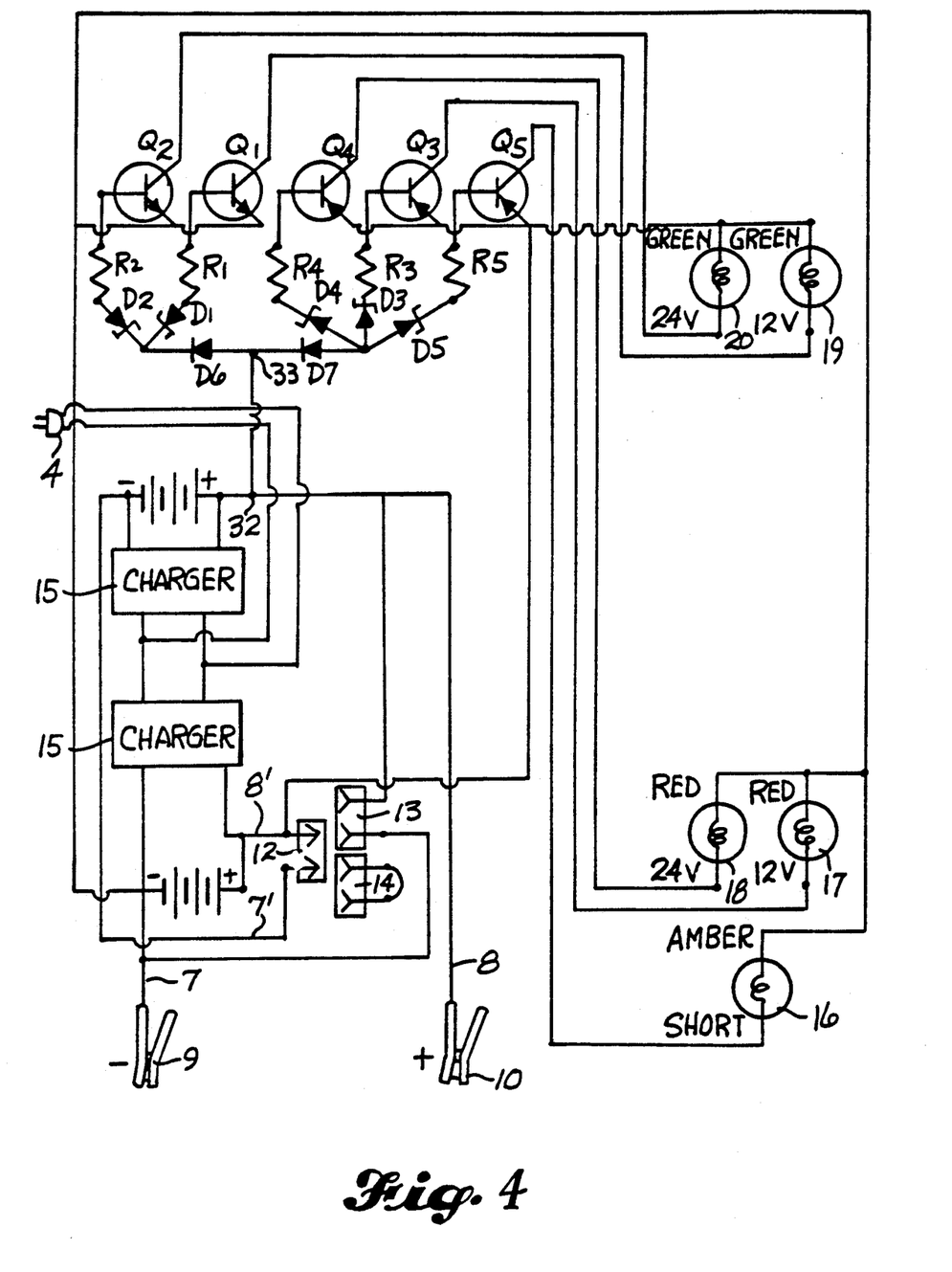
FIG. 4 is a schematic circuit diagram of a second form of portable battery booster in accordance with the present invention.

The modified circuit shown in FIG. 4 eliminates the need for a rocker switch and relay to test for a short between the jumper cable end clamps 9 and 10. Indicator lamps 16, 17, 18, 19 and 20 still are controlled by separate transistors Q5, Q3, Q4, Q1 and Q2, respectively. Each transistor is provided with a voltage and current-controlling resistor and Zener diode. Appropriate values are as follows:

R1, R2, R3, R4: 6.8 K ohms
R5: 3.6 K ohms
D1: 3.3-volt Zener
D2: 13-volt Zener
D3: 15-volt Zener
D4: 25-volt Zener
D5: 8.2-volt Zener Trimmer diodes D6 and D7 still control actuation of the correct polarity pair of transistors Q1 and Q2 for the green lamps 19 and 20 or the incorrect polarity pair of transistors Q3 and Q4 for the red lamps 17 and 18. The values of the base resistors and Zener diodes are selected for actuation of both lamps of a pair if the voltage across the end clamps 9 and 10 is about 15 volts to 24 volts, but only a single lamp (17 for incorrect polarity and 19 for correct polarity) if the voltage applied across the end clamps is about 12 volts. In the case of a short between end clamps 9 and 10, the negative terminal of battery B2 is connected to the positive terminal of battery B1 and can be considered to be the grounded (zero voltage) state at points 32 and 33. The positive terminal of battery B2 is applied at the transistors, but diode D6 prevents current flow through transistors Q1 and Q2. The threshold voltage of diode D5 (8.2-volt Zener) is exceeded, thereby actuating transistor Q5 and the corresponding amber lamp 16 and indicating to the operator that there is a short between the jumper cable end clamps.

In other respects, the embodiment of FIG. 4 is identical to the embodiment of FIG. 1.

Figure 5:
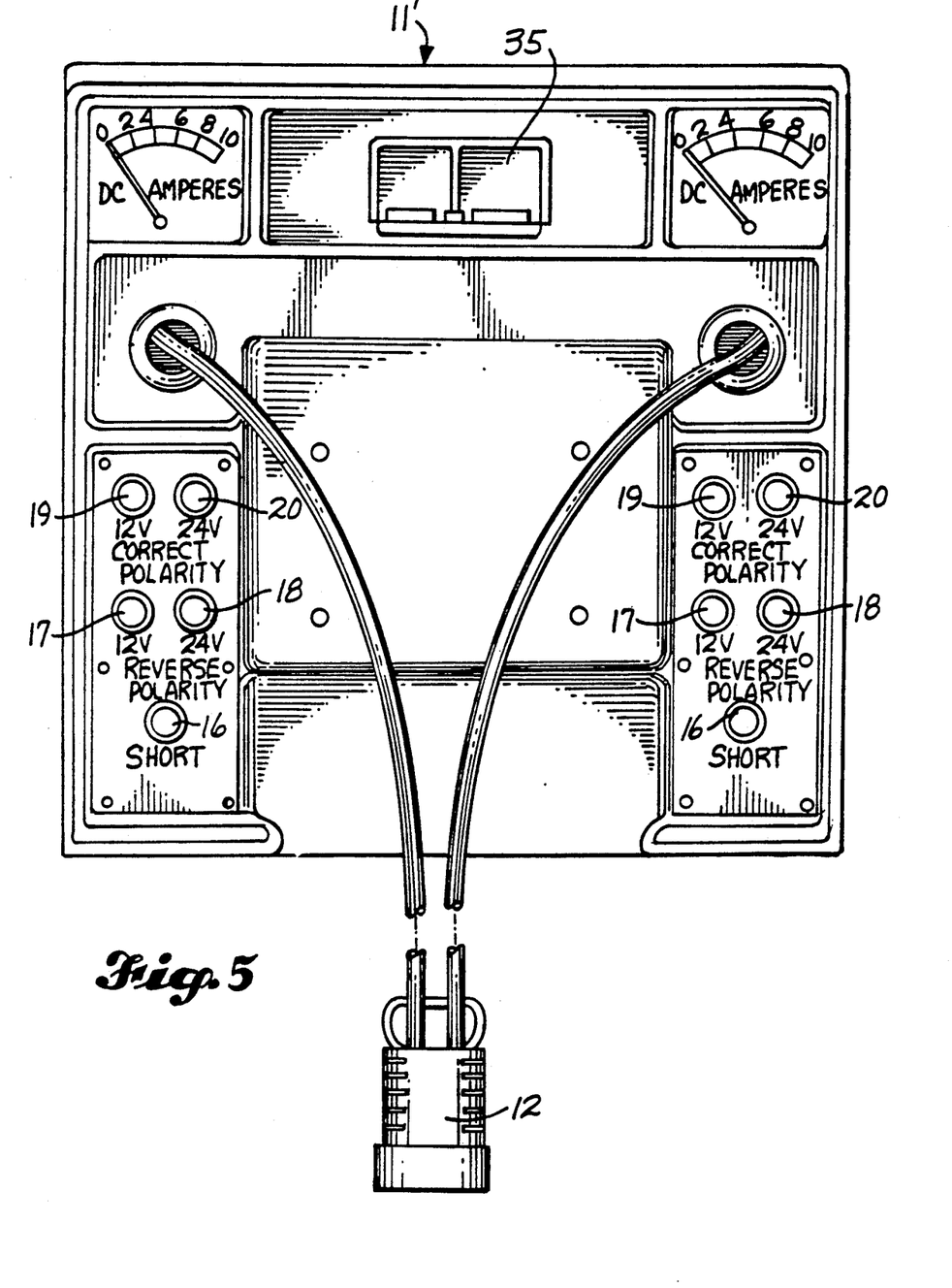
FIG. 5 is a fragmentary front elevation of the control panel of a third embodiment of portable battery booster in accordance with the present invention.

FIG. 5 illustrates the control panel 11' of a third embodiment of the present invention which would be utilized with a wheeled cabinet of the type shown in FIG. 1. The circuit diagram is shown schematically in FIG. 6. Rather than providing a single pair of jumper cables, the embodiment of FIG. 5 utilizes two pair of jumper cables 7, 8, one for each of the internal booster batteries B1 and B2. Unlike the previously described embodiments, the two internal booster batteries cannot be connected in series. Rather, interconnection of the single plug 12 with a socket 35 has the effect of connecting one battery to one pair of jumper cables and the other battery to the other pair of jumper cables. For each pair of jumper cables, there is a separate bank of display lamps 16 through 20 to indicate a short, reverse or correct polarity, and 12-volt or 24-volt potential for the corresponding pair.

Figure 6:
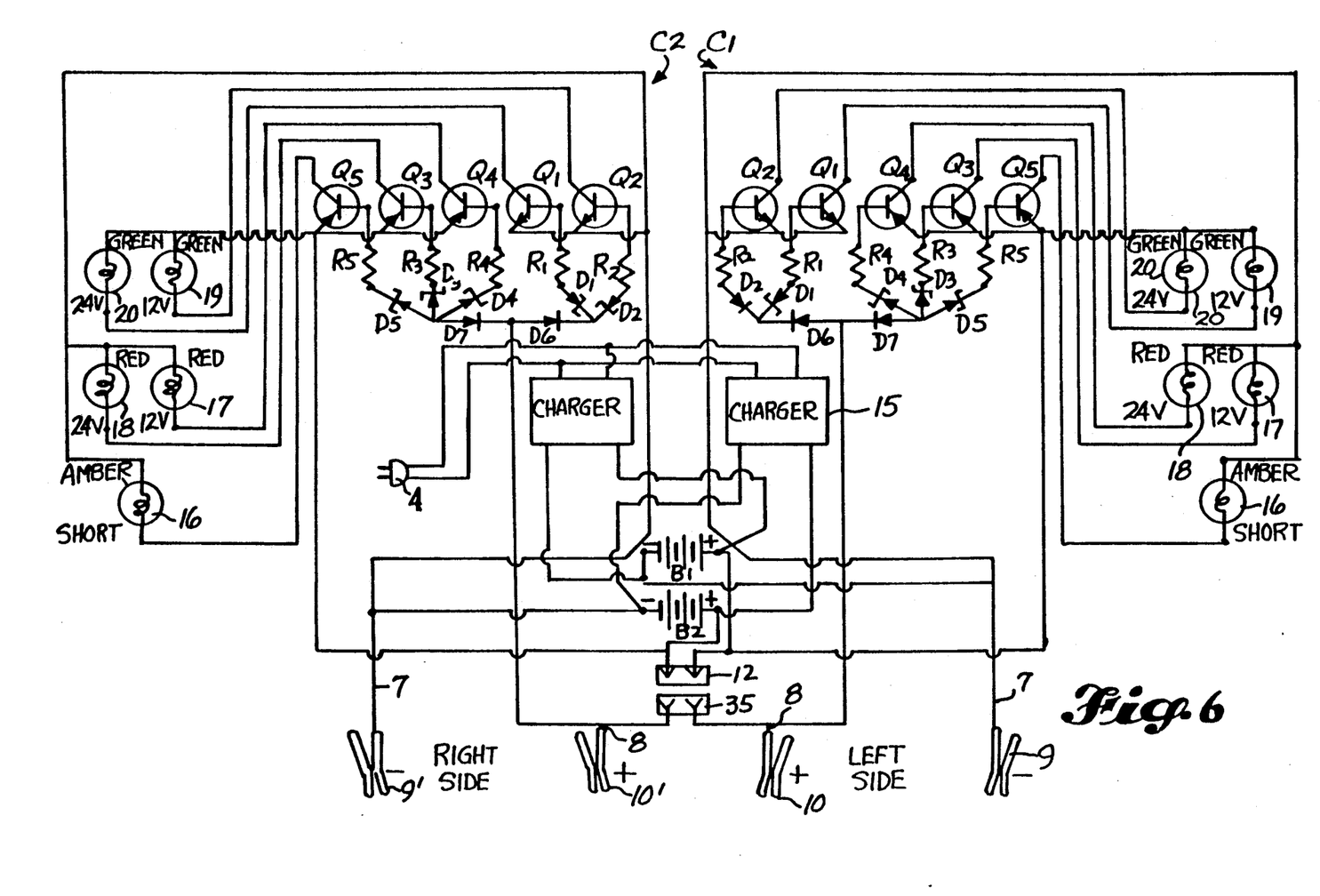
FIG. 6 is a schematic circuit diagram of the third embodiment of portable battery booster in accordance with the present invention.

The circuit diagram is shown in FIG. 6. It will be seen that, as in the previously described embodiments, a separate charger 15 is provided for each of the booster batteries B1 and B2. The negative end clamp 9 of one pair of cables is connected to the negative terminal of one of the booster batteries B1 and the negative end clamp 9' of the other cable pair is connected to the negative terminal of the other booster battery B2. The plug 12 and socket 35 are used for connecting the positive end clamps 10 and 10' of both pairs simultaneously of their batteries B1 and B2. The respective circuits C1 and C2 for the two pairs of jumper cables are identical and operate independently of each other. The values for the circuit components are identical to the values for the circuit shown in FIG. 4 and the operation of each circuit is the same as for the circuit shown in FIG. 4.

Figure 7:
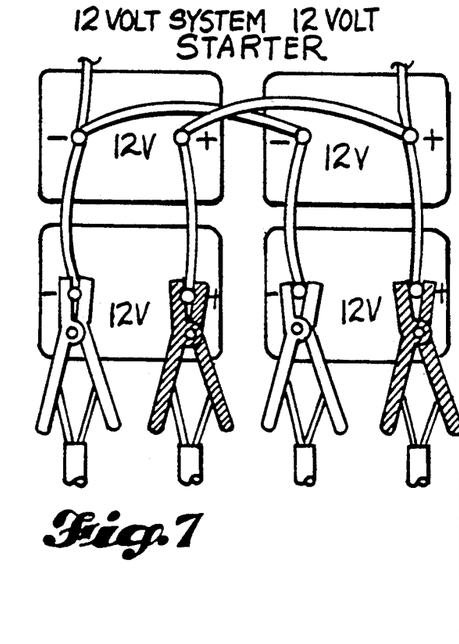
FIG. 7, FIG. 8 and FIG. 9 are corresponding schematic diagrams illustrating interconnection of the jumper cables of the third embodiment of the present invention for different types of vehicle electrical systems and starters.
Figure 8:
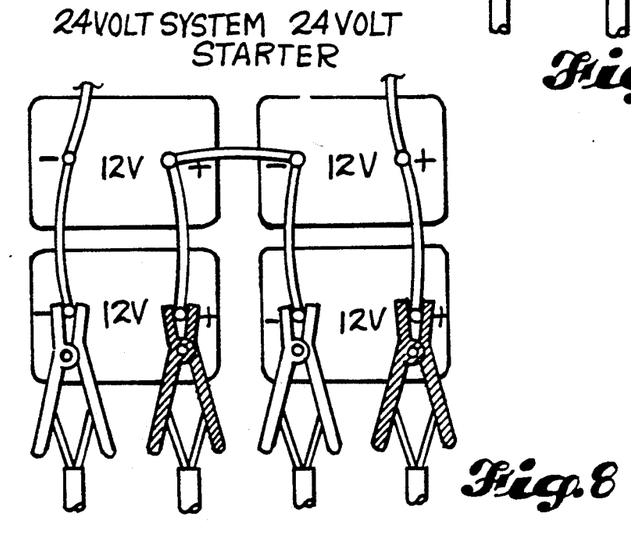
Figure 9:
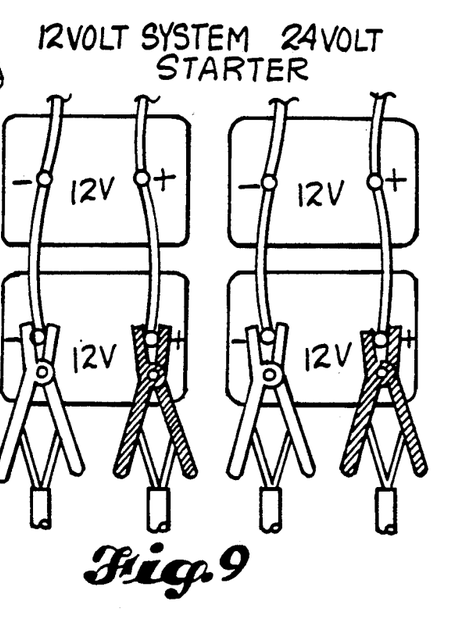

FIGS. 7, 8 and 9 illustrate proper connection for the two pair of booster cables in different types of systems. FIG. 7 illustrates how four 12-volt batteries would be interconnected for a 12-volt electrical system with a 12-volt starter. The two batteries at the left are connected in parallel, as are the two batteries at the right. The two banks of batteries are, in turn, connected in parallel. FIG. 8 illustrates how four 12-volt batteries would be interconnected for a 24-volt electrical system having a 24-volt starter. Again, the two batteries at the left are connected in parallel, as are the two batteries at the right. The left and right banks, however, are connected in series for a 24-volt output. FIG. 9 illustrates how four batteries might appear in the battery compartment component of a more troublesome system, namely, a 12-volt electrical system having a 24-volt starter.

For jump starting any of the three systems shown in FIGS. 7, 8 and 9, preferably one pair of booster cables with proper polarity is connected across the terminals of one battery of the left or right bank, and the other pair is connected with proper polarity across the terminals of a battery of the other bank. If polarity is reversed for either set of cables or if there is a short between end clamps of either pair of cables, the operator will be alerted by the appropriate indicator lamp. Similarly, in the 24-volt system shown in FIG. 8, if either pair is connected improperly across 12-volt batteries connected in series, the 24-volt indicator lamp will be lit as well as the 12-volt indicator light, thereby alerting the operator not to connect the internal booster batteries to the vehicle batteries by insertion of the booster unit plug 12 into the socket 35.

I claim:

1. A booster unit for jumping a vehicle battery or batteries comprising first booster battery means for producing electric power of a first potential, second booster battery means separate from said first booster battery means for producing electric power of a second potential, jumper cable means for conveying electric power and having end clamps connectible to the vehicle battery or batteries, means for connecting said jumper cable means to said first and second booster battery means, said connecting means including a first connector component and a plurality of second connector components, said first connector component being connected to said jumper cable means and being optionally connectible to either one of said second connector components, said connecting means further including means interconnecting said first and second booster battery means with said second connector components such that when said first connector component is connected to one of said second connector components, power of the first potential is conveyed through the jumper cable means, whereas when said first connector component is connected to the other of said second connector components, power of a potential equal to the first potential plus the second potential is conveyed through the jumper cable means, and display and circuit means operable when said first connector component is disconnected from said second connector components for indicating the polarity of power across said jumper cable means when said jumper cable means are connected to the vehicle battery or batteries, said display and circuit means including a bank of indicator lamps and means for actuating said lamps including a first lamp actuated when said jumper cable means are applied across vehicle batteries of about 12 volts potential and a second lamp actuated when said jumper cable means are applied across vehicle batteries of much more than 12 volts but less than about 24 volts potential.

2. The unit defined in claim 1, in which the first potential is equal to the second potential.

3. The unit defined in claim 2, in which the first booster battery means is a 12-volt battery and the second booster battery means is a 12-volt battery.

4. The unit defined in claim 1, the first and second connector components being plug and socket connector components manually interfittable and manually disconnectible.

5. The unit defined in claim 1, in which the display and circuit means includes means for indicating a short between the jumper cable means.

6. A boost unit for a vehicle battery or batteries comprising at least one booster battery means for producing electric power of a first potential, at least one pair of jumper cables, each cable of said pair having an end clamp for connection to the vehicle battery or batteries, connector means for interconnecting said jumper cables with said booster battery means and manually manipulable for disconnecting said jumper cables from said booster battery means, and display and circuit means operable when said end clamps of said jumper cables are connected to said vehicle battery or batteries but said jumper cables are disconnected from said booster battery means for indicating the polarity and approximate potential of power across said jumper cable end clamps applied by said vehicle battery or batteries, said display and circuit means including several lamps and means for actuating said lamps including a first lamp actuated when a short is applied across said jumper cable end clamps, a second lamp actuated when voltage of a first polarity and a first potential is applied across said jumper cable end clamps, a third lamp actuated when voltage of said first polarity but of a different much greater potential is applied across said jumper cable end clamps, a fourth lamp actuated when voltage of a different polarity but approximately the first potential is applied across said jumper cable end clamps and a fifth lamp actuated when voltage of such different polarity and of the different much greater potential is applied across said jumper cable end clamps.

7. A booster unit for vehicle batteries comprising first booster battery means for producing electric power of a first potential, second booster battery means separate from the first booster battery means for producing electric power of a second potential, two pairs of jumper cables for conveying electric power and each having end clamps for connection to the vehicle batteries, and a plug and socket connector manually connectible to convey power from said first booster battery means through one pair of said jumper cables and said second booster battery means through said second pair of jumper cables, said connector being manually disconnectible to cut off the supply of power from the first and second booster battery means through said two pairs of jumper cables to the vehicle batteries, means for sensing and indicating the polarity of power applied across said jumper cable end clamps of one pair, means for sensing and indicating the polarity of power applied across said jumper cable end clamps of the other pair, means for sensing and indicating different potentials applied across said end clamps of one pair of said jumper cables, and means for sensing and indicating different potentials applied across said end clamps of the other pair of said jumper cables, all of said sensing and indicating means being operable when said connector is disconnected.

8. The unit defined in claim 7, including means for sensing and indicating a short between the end clamps of one pair of the jumper cables and means for sensing and indicating a short across the end clamps of the other pair of the jumper cables.

* * * * *